United States Patent Office 3,266,979
Patented August 16, 1966

3,266,979
3,3 - DIBUTYL - 2 - (2,2,4-TRIMETHYLPENTYL) PSEUDOUREA AS AN INSECT REPELLENT
Harry H. Incho, Medina, N.Y., and Sylvan E. Forman, Trenton, N.J., assignors to FMC Corporation, a corporation of Delaware
No drawing. Filed Aug. 17, 1964, Ser. No. 390,228
7 Claims. (Cl. 167—22)

This invention relates to insect repellents, and particularly to novel repellent compositions and a novel method of repelling insects, particularly flies, roaches and related pests.

There has been substantial progress in the development of synthetic insecticides which are effective to control and to kill undesired insects. However, particularly with respect to pests where effective control by killing is difficult, due to the nature of the pests or the environment, or where the health and comfort of man and animals may be concerned, it may be useful to repel such insects from environments in which their presence is undesirable. Thus, pests such as the cockroach and the housefly and stable fly, which exist in close relationship to man and animals, are desirably repelled from association with man or animals or with food or with waste products, to prevent the spread of disease. It is also desirable to use repellents to prevent the movement of such pests from one area to another. A long-lasting repellent is especially desirable to avoid the need for continual re-application, or for such uses as on shipping containers, for example, where continuing treatment may not be feasible.

We have discovered that effective, long-lasting insect repellency may be achieved through use of repellent compositions comprising an effective amount of the compound 3,3-dibutyl - 2 - (2,2,4-trimethylpentyl)pseudourea. These compositions may be used alone as repellents, or in conjunction with insecticidal compounds, to achieve long-lasting and effective activity. This active compound is characterized by a marked persistency of repellent action, and has been found to be superior in performance to commercially used repellents, in both initial and residual activity.

The chemical compound of this invention has the following structural formula:

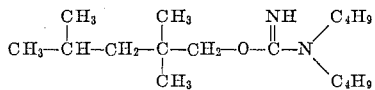

The nomenclature of the above compound is subject to variation in the chemical literature, in that the terms pseudourea and isourea are synonymous and are used interchangeably. For consistency, used herein is the nomenclature recommended by Chemical Abstracts, i.e., 3,3-dibutyl-2-(2,2,4-trimethylpentyl)pseudourea.

The above compound may be prepared by the transalkylation reaction of 2,2,4-trimethylpentyl alcohol with 2-methyl-3,3-dibutylpseudourea, or by reaction of 2,2,4-trimethylpentyl alcohol with dibutylcyanamide in the presence of a sodium alkoxide catalyst, as described by Forman, Erickson and Adelman, J. Org. Chem. 28, 2653 (1963). The intermediate dibutylcyanamide may be prepared according to the procedure outlined by W. L. Garbrecht and R. M. Herbst, J. Org. Chem. 18 (1953). Preparative details are illustrated in the following example:

EXAMPLE I

Six tenths gram of sodium was dissolved in 100 g. of 2,2,4-trimethylpentyl alcohol and 125 ml. of benzene by refluxing the mixture overnight, and 38.5 g. of 3,3-dibutyl-2-methylpseudourea was added. The mixture was slowly distilled through a packed column to remove the methanol as the azeotrope with benzene. Sufficient benzene was added during the distillation to keep the pot temperature below 110° C. When no more methanol could be obtained, the sodium alkylate in the pot was neutralized with 2 ml. of glacial acetic acid, and the mixture washed with 50 ml. of water. The benzene and excess alcohol were distilled under vacuum, and the residue fractionated to yield 54 g. of 3,3-dibutyl-2-(2,2,4-trimethylpentyl) pseudourea, boiling at 70–74°/0.002 mm., $n_D^{25}$ 1.4539, $d_4^{25}$ 0.8810.

Neutralization equivalent: Calc'd, 284.5; found, 285.8.
Analysis.—Calc'd for $C_7H_{36}N_2O$: C, 71.78; H, 12.76; N, 9.85. Found: C, 71.61; H, 12.70; N, 9.74.

This compound exhibits excellent repellency against the German cockroach (Blatella germanica), against houseflies (Musca domestica), stable flies (Stomoxys calcitrans (L.)) and other flying and crawling insects.

In carrying out this invention, repellent compositions comprising 3,3 - dibutyl - 2 - (2,2,4 - trimethylphenyl) pseudourea may be applied in any suitable fashion to the area in which insect repellency is desired, in an amount and concentration effective to achieve such repellency. Repellent compositions may be applied, as is well known in the art, as solids or liquids, as sprays including pressurized space sprays, and in organic or aqueous solution or dispersion.

Other useful formulations include emulsifiable concentrates for aqueous spray application, suitable for use on animals, in rooms, warehouses, etc. Emulsifiable concentrates are homogeneous liquid or paste compositions which are readily dispersed in water or other dispersant, and may consist entirely of 3,3-dibutyl-2-(2,2,4-trimethylpentyl)pseudourea with a liquid or solid emulsifying agent, or may also contain a liquid carrier, such as xylene, heavy aromatic naphthas, isophorone and other nonvolatile organic solvents. For repellent application these concentrates are dispersed in water or other liquid carrier, and normally applied as a spray to the area to be treated. The percentage by weight of the essential active ingredient may vary according to the manner in which the composition is to be applied, but in general comprises 0.5 to 95 percent of active ingredient by weight of the repellent composition.

Typical wetting, dispersing or emulsifying agents which may be used in repellent formulations include, for example, the alkyl and alkylaryl sulfonates and sulfates and their sodium salts; polyethylene oxides; sulfonated oils; fatty acid esters of polyhydric alcohols; and other types of surface active agents, many of which are available in commerce. The surface active agent, when used, normally comprises from 1 percent to 15 percent by weight of the repellent composition.

The repellent may be applied as a dry dust, particularly for control of non-flying insects such as roaches. The active repellent is admixed with finely divided solids such as talc, attapulgite clay, kieselguhr, and other organic and inorganic solids which act as dispersants and carriers for the toxicant; these finely divided solids have an average particle size of less than about 50 microns. Since the instant toxicant is an oily liquid, an absorbent dust can accommodate high concentrations of active ingredient, if desired. A typical dust formulation, useful herein, is one containing 10.0 parts of 3,3-dibutyl-2-(2,2,4-trimethylpentyl)pseudourea, 30.0 parts of bentonite clay and 60.0 parts talc.

Wettable powders, also useful formulations for repellents, are in the form of finely divided particles which disperse readily in water or other dispersant. The wettable powder may be ultimately applied to the area either as a dry dust or as an emulsion in water or other liquid. Typical carriers for wettable powders include Fuller's earth, kaolin clays, silicas, and other highly absorbent, readily wet inorganic diluents. Wettable powders normally are prepared to contain about 5–80% active ingredient, depending on the absorbency of the carrier, and usually also contain a small amount of a wetting, dispersing or emulsifying agent to facilitate dispersion. For example, a useful wettable powder formulation contains 25.0 parts of 3,3-dibutyl-2-(2,2,4-trimethylpentyl)pseudourea, 72.0 parts of bentonite clay and 1.5 parts each of sodium lignosulfonate and sodium laurylsulfonate as wetting agents.

Other useful formulations for repellent applications include simple solutions of the active ingredient in a dispersant in which it is completely soluble at the desired concentration, such as acetone, alcohols, naphthas, kerosene, aromatic and aliphatic liquid hydrocarbons including benzene, xylene, cresol, and the like. The choice of solvent may depend on the desired mode and situs of application.

Granular formulations, wherein the toxicant is carried on relatively coarse particles, are of particular utility for distribution to repel crawling insects. Pressurized sprays, typically aerosols wherein the active ingredient is dispersed in finely divided form as a result of vaporization of a low boiling dispersant solvent carrier, such as the Freons, may also be used.

In addition, the active repellent may be combined with other conventional materials and toxicants to impart repellency to pesticidal formulations. In application in areas containing growing plants, attention should be given to the phytotoxicity of the compound of this invention.

The concentration of 3,3-dibutyl-2-(2,2,4-trimethylpentyl)pseudourea in these formulations may vary from 0.001 to about 95 percent by weight, depending on the formulation. In liquid solution or dispersion, aqueous or organic, preferred concentrations are generally in the range of 0.01 to 5 percent by weight. Liquid and solid concentrates may contain from about 2.5 to 95 percent by weight of active repellent. Solid dusts and granular formulations may contain as little as 0.001 to over 50 percent by weight of repellent. A very broad latitude and choice of type and concentration of formulation is available. It is important merely that enough of the repellent composition be applied, in the situs in which repellency is desired, to deposit a repellent amount and concentration of the active ingredient. As is well known in this art, the degree of effectiveness of a toxicant may vary with the formulation and method of application.

The repellent activity of 3,3-dibutyl-2-(2,2,4-trimethylpentyl)pseudourea is exemplified further as follows:

EXAMPLE II

Repellency against the German cockroach was evaluated by the general method of Goodhue, J. Econ. Entom. 53, 805–10 (1960). File cards, 3″ x 5″, were dipped in an acetone solution of the test compound, and allowed to dry. The cards were placed in a slanting position against the sides of a clear plastic box containing about two thousand German cockroaches. The number of roaches resting on the treated cards were counted at specified intervals, and compared with an untreated control to determine the repellency, calculated according to the following formula:

Percent repellency =
$$\frac{(\text{No. on control card} - \text{No. on treated card})}{\text{No. on control card}} \times 100$$

The cards were left in each box for six hours each day, and the repellency was determined at intervals during each six hour period. The same cards were replaced on successive days, to ascertain the effect of deposit age on repellency. Results are shown in the following table, wherein "Deposit Age" refers to the period which elapsed between the time of treatment of the cards and the initiation of that day's exposure of the roaches to the cards. The "Exposure Time" is the period of time, each day, during which the roaches were exposed to the treated cards. The compound of this invention is compared with the commercial cockroach repellent "R–11" (1,5a,6,9,9a,9b-hexahydro-4a(4H)-dibenzofurancarboxaldehyde):

Table 1.—Repellency against the German cockroach

| Material | Concn. in Acetone, percent | Deposit Age (Days) | Percent Repellency—Exposure Time (Hours) | | | |
|---|---|---|---|---|---|---|
| | | | 0.25 | 1.0 | 3.0 | 6.0 |
| 3,3-dibutyl-2-(2,2,4-trimethylpentyl) pseudourea | 5.0 | 0 | 100 | 100 | 100 | ----- |
| | | 1 | 100 | 100 | 100 | 100 |
| | | 2 | 100 | 100 | 100 | ----- |
| | 2.5 | 0 | 100 | 100 | 100 | ----- |
| | | 1 | 100 | 100 | 100 | 100 |
| | | 2 | 100 | 100 | 100 | ----- |
| | 1.25 | 0 | 100 | 100 | 100 | ----- |
| | | 1 | 100 | 100 | 100 | 100 |
| | | 2 | 100 | 100 | 100 | 100 |
| "R–11" | 5.0 | 0 | 100 | 100 | 100 | ----- |
| | | 1 | 98.5 | 98.6 | 99.1 | 98.1 |
| | | 2 | 0 | 7.1 | 9.2 | ----- |
| | 2.5 | 0 | 98.0 | 100 | 99.5 | ----- |
| | | 1 | 80.5 | 78.7 | 40.5 | 35.7 |
| | | 2 | 0 | 0.8 | 0 | ----- |

It is seen that the compound of this invention is a very efficient and long-lived roach repellent, and compares very favorably with a standard repellent.

EXAMPLE III

The compound of this invention was also evaluated, in comparison with the commercial repellent "R–11," by a modification of the method of Example II, wherein cards which had been dipped in a 2% acetone solution of the test compound were left in the box of roaches continuously, for a total of 28 days. The percent repellency was evaluated each day. Representative results are shown in the following table:

Table 2.—Repellency against the German cockroach

| Deposit Age (Days) | Percent Repellency—3,3-dibutyl-2-(2,2,4-trimethylpentyl) pseudourea | "R–11" |
|---|---|---|
| 1 | 100 | 30 |
| 2 | 100 | 26 |
| 4 | 100 | 0 |
| 6 | 100 | 20 |
| 8 | 100 | 0 |
| 10 | 100 | 12 |
| 12 | 100 | 10 |
| 16 | 100 | 13 |
| 20 | 100 | 36 |
| 24 | 96 | 8 |
| 26 | 87 | 0 |
| 28 | 41 | 0 |

EXAMPLE IV

This compound was evaluated as a housefly repellent, following the Bruce turntable method, as follows: Filter papers, 5.5 cm. in diameter, were treated with 0.05 ml. of an acetone solution of the test material at the concentrations specified in the table, and dried. The filter papers were formed into cones and the inverted cones placed in small hollow plastic stoppers on the periphery of a slowly-revolving screen turntable within a large plastic box. Small weighed lactose pellets were placed within the cones so that the feeding flies would be forced to rest on the treated paper. Untreated filter paper cones containing weighed lactose pellets were included as controls. The turntable was exposed for a period of one hour to houseflies (Musca domestica) which previously had been starved for one hour. After this period the pellets were reweighed and the loss in weight of pellets in the treated samples was compared with that of the untreated controls, to give a quantitative measure of the degree of repellency. Results are shown in Table 3 below.

*Table 3.—Repellency against houseflies*

| Concentration, percent: | Percent repellency |
|---|---|
| 2.0 | 100 |
| 1.0 | 100 |
| 0.1 | 100 |

It is seen that the compound of this invention exhibits excellent repellency against houseflies.

EXAMPLE V

The subject compound was evaluated as a stable fly repellent following the animal membrane method, as reported in J. Econ. Entom. 53, 432–5 (1960), by Philip Granett, Rutgers, The State University, New Brunswick, New Jersey. This method is reported by Mr. Granett "to more closely parallel the order of effectiveness obtained in field experience with repellents on dairy animals." Results obtained by this method, in comparison with the commercial product "Crag Fly Repellent" (butoxy polypropylene glycol), are shown in Table 4.

*Table 4.—Repellency against stable flies*

| Compound | Concentration in Acetone, Percent | Average, Percent Repellency |
|---|---|---|
| 3,3-dibutyl-2-(2,2,4-trimethylpentyl) pseudourea | 2.5 | 100 |
| | 1.25 | 100 |
| | 0.62 | 91 |
| Crag Fly Repellent | 2.5 | 55 |

The above data show the compound of the instant invention to be an excellent repellent against stable flies, under conditions designed to simulate field experience.

It is apparent that variations and modifications may be made within the scope of the foregoing disclosure and the appended claims, without departing from the essential principles of this invention.

We claim:
1. An insect repellent composition comprising as an essential ingredient an effective amount of 3,3-dibutyl-2-(2,2,4-trimethylpentyl)pseudourea and a carrier.
2. An insect repellent composition comprising 3,3-dibutyl-2-(2,2,4-trimethylpentyl)pseudourea and an inert adjuvant in admixture therewith, wherein said pseudourea is present in an amount of from 0.001 to about 95 percent by weight.
3. An insect repellent composition comprising 3,3-dibutyl-2-(2,2,4-trimethylpentyl)pseudourea and a dispersing agent in admixture therewith, wherein said pseudourea is present in an amount of from 0.001 to about 95 percent by weight.
4. A method of repelling insects which comprises subjecting such insects to the action of an effective quantity of 3,3-dibutyl-2-(2,2,4-trimethylpentyl)pseudourea.
5. 3,3-dibutyl-2-(2,2,4-trimethylpentyl)pseudourea.
6. A roach repellent composition comprising 3,3-dibutyl-2-(2,2,4-trimethylpentyl)pseudourea and an inert adjuvant in admixture therewith, wherein said pseudourea is present in an amount of from 0.001 to about 95 percent by weight.
7. A method of repelling roaches which comprises subjecting roaches to the action of an effective quantity of 3,3-dibutyl-2-(2,2,4-trimethylpentyl)pseudourea.

No references cited.

JULIAN S. LEVITT, *Primary Examiner.*

V. C. CLARKE, *Assistant Examiner.*